R. H. Hudson,
Screw Propeller.
No. 67,982.   Patented Aug. 20, 1867.
Fig: 1.
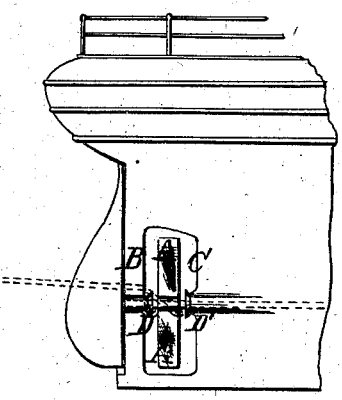
Fig: 2.   Fig: 3.
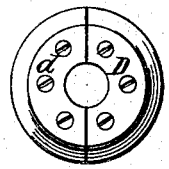 
Witnesses:   Inventor:

United States Patent Office.

RICHARD HARVEY HUDSON, OF GLASGOW, SCOTLAND.

Letters Patent No. 67,982, dated August 20, 1867.

---

IMPROVED MEANS TO PREVENT ROPES FOULING SHIPS' PROPELLERS.

---

The Schedule referred to in these Letters Patent and making part of the same.

---

TO ALL WHOM IT MAY CONCERN:

Be it known that I, RICHARD HARVEY HUDSON, of the city of Glasgow, Scotland, have invented a new and complete Anti-Fouler to prevent Ropes from Fouling Ships' Propellers; and I do hereby declare that the following is a full, clear, and exact description thereof, which will enable others skilled in the art to make and use the same, reference being had to the accompanying drawings, forming part of this specification.

This invention relates to a device for preventing ropes from fouling ships' propellers, and consists of two disks (each made in two sections) of steel, or of iron or other metal sheathed with steel, and fixed securely, one disk to the stern-post before, and the other to the rudder-post abaft the screw. In the accompanying drawings—

Figure 1 is a view of my anti-fouler in place.
Figure 2 is a front view of one of the disks, and
Figure 3 is an edge view of one of the sections of which the disk is composed.
Similar letters of reference indicate corresponding parts.

A is a ship's propeller, B is the rudder-post, and C the stern-post. D and D' are my anti-foulers, set, one upon the rudder-post abaft the screw, and the other upon the stern-post before it, and fastened by screw-bolts. The anti-fouler is a disk of steel, or of some suitable material sheathed with steel, and ground sharp as an axe-edge, so that when a rope is picked up by the screw the back-water sending the rope across the disk, as shown in red ink, fig. 1, the next turn of screw draws the rope tight over the sharp edge of the disk, cutting it, and preventing the screw from being fouled.

I prefer to make each disk of two pieces, D d, fig. 2, so that the cutter may be taken off and sharpened without unshipping the rudder. One disk only might be used, but I prefer to employ two, as described.

Having thus described my invention, what I claim as new, and desire to secure by Letters Patent, is—

The disk D of steel or steel sheathed attached to the stern-post or rudder-post of a vessel, in manner and for the purpose substantially as described.

RICHARD HARVEY HUDSON.

Witnesses:
ROBERT S. KELLY,
JAMES S. KELLY.